June 17, 1958 — H. BRUDNEY — 2,838,874
DOLL'S EYES
Original Filed Nov. 2, 1953
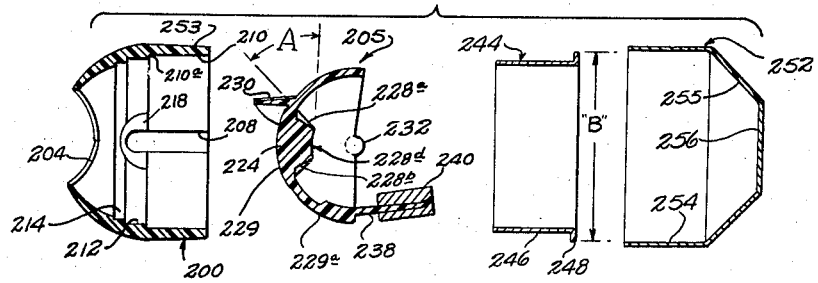
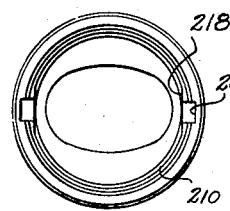
FIG. 2
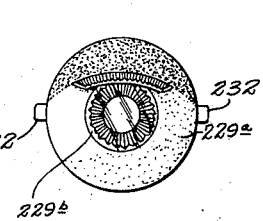
FIG. 3
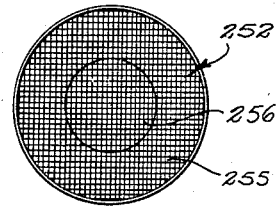
FIG. 4
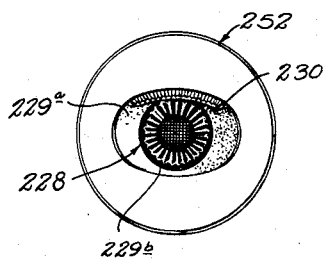
FIG. 6
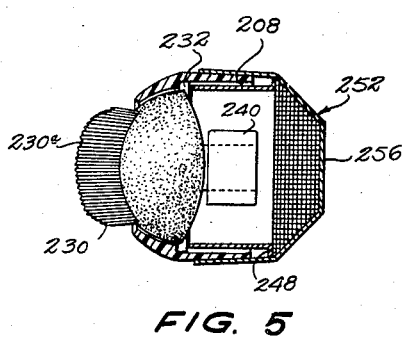
FIG. 5
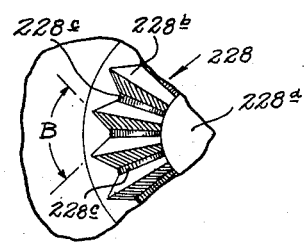
FIG 7
INVENTOR.
HARRY BRUDNEY
BY
ATTORNEY United States Patent Office 2,838,874
Patented June 17, 1958

2,838,874

DOLL'S EYES

Harry Brudney, New York, N. Y., assignor to Dollac Corporation, New York, N. Y., a corporation of New York Original application November 2, 1953, Serial No. 389,700, now Patent No. 2,753,660, dated July 10, 1956. Divided and this application March 26, 1956, Serial No. 573,770

4 Claims. (Cl. 46—169)

This invention relates to dolls' eyes and more particularly to movable eyes intended for individual mounting in the eye sockets of a sleeping doll's head. Certain features of my invention shown and described, but not claimed herein, are shown, described and claimed in my co-pending application S. N. 389,700, filed November 2, 1953, for Doll's Eye and Mount Therefor, now Patent No. 2,753,660, of which the present application is a division.

It is an object of my invention to provide an economical sturdy construction for a doll's eye which will be entirely enclosed as to mechanism and which can be easily mounted within a doll's head.

It is a further object of my invention to provide a doll's eye structure which can be cheaply manufactured as to its component parts and easily assembled.

My invention utilizes a non-resilient retaining ring which slides into a resilient socket to engage the eye ball trunnions. A casing is forced over the rear cylindrical portion of the socket to clamp the material of the socket on to the ring.

A detailed description of my invention will now be given in conjunction with the appended drawing, in which:

Fig. 1 is an exploded view of a doll's eye embodying my invention.

Fig. 2 shows a rear view of the socket of Fig. 1.

Fig. 3 shows a front view of the eyeball of Fig. 1 as it would appear when unenclosed.

Fig. 4 shows the black interior of the casing shown in Fig. 1.

Fig. 5 shows a horizontal partial section through the assembled eye.

Fig. 6 shows a front view of the assembled eye, and

Fig. 7 is a magnified view of a portion of the iris.

Referring to the drawing,

I have shown an individual eye assembly which comprises a molded plastic socket 200 having a horizontally elongated eye opening 204 through which there conventionally is substantially exposed, under circumstances of which the art is aware, the pupil and iris area of an eyeball 205. The socket is fully open at the rear end thereof and is formed with a pair of internal diametrically opposite laterally disposed grooves 208 that lie in a common horizontal plane when the eye is conventionally located in an erect doll's head. The rear portion, i. e., skirt, of the shell is internally recessed at 210 providing a shoulder 210a and the forward curved portion of the shell has thickened internal ridges such as 212 and 214. The grooves 208 terminate forwardly in reinforcing flattened areas 218 and terminate rearwardly at the rim of the skirt so that they open to the rear of the shell as shown in Fig. 2.

The eyeball is preferably molded of a transparent plastic, and I prefer to provide a slight blue tint thereto. The pupil area 224 is relatively smooth while the iris 228, surrounding the pupil, comprises a plurality of plane surfaces such as 228a and b. These surfaces are molded at the rear in a frustoconical formation angle A being about 45°. The surfaces are related at an angle B of 80° to 110° (Fig. 7) extending in radial directions outwardly of the pupil and face the interior of the eyeball chamber, there being flat spacing surfaces 228c between adjacent surfaces 228a and 228b. Thus, light entering the iris area strikes the surfaces 228a and b, primarily, and is substantially prevented, or at least prevented to a high degree from passing into the eyeball interior, being reflected outwardly again from the surfaces. I have found that the providing of a concave curvature in the central exposed area 228d of the molded iris formation, this being the pupil region, serves to effect a sharp delineation of the pupil. The degree of curvature is not critical and may be greater than the eyeball radius as shown. The outer surface 229 of the eyeball is raised a few thousandths of an inch in the range .001" to .01" where it is concentric with the iris, this portion being transparent, and the remaining surface 229a is coated with any suitable opaque white substance up to the circular area 229b which surrounds the iris. Thus, any light entering into the interior of the eyeball can come only through the pupil and iris and area 229b.

An eyelash 230 is molded directly of the material of the eyeball, having a ridged formation and terminating in a corrugated edge 230a. A pair of diametrically opposed horizontal trunnions 232 are molded to project from the sides of the eyeball in position to engage within respective grooves 208 during assembly.

Finally, a weight support lever 238 is molded integrally with the eyeball and a metallic weight 240 is clinched onto the end of the lever as shown in Fig. 1.

Thus, it will be apparent that the eyeball may be slid into the eye socket 200 and pivotally supported on its trunnions 232 which are carried in the respective grooves 208 and rotatably engage the front ends of the grooves at the flat areas 218.

In order to retain the eyeball in place a ring 244 of metal or plastic may be utilized having a tubular portion 246 which is accommodated within the recess 210 as far as shoulder 210a. Ring 244 has a rear outwardly extending flange portion 248 which is spaced rearwardly from the back edge of the skirt 210 as shown in Fig. 5. The tubular portion 246 reinforces the eye socket as well as forming means for securely retaining the eyeball in proper pivotal position.

If desired the ring 244 may have a force fit within recess 210. However, I prefer to make it smoothly slidable therein and rely on the casing element 252 having a substantially tubular portion 254 which may be given a slight taper, if desired, to grip the outer marginal peripheral edge 253 of the skirt of the eye socket and deform it inwardly radially so as to securely bind the socket onto the tubular portion 246. It will, of course, be apparent that flange 248 should be of a diameter slightly less than the inside diameter of casing portion 254 and it will likewise be apparent that one or more narrow slits may be provided in the material of the recessed skirt 210 to promote resiliency so that such recessed portion may be more easily pressed against the tubular portion 246 of the ring. The flange 248 is engaged by the sloping rear surface 255 of the casing, which casing is closed by an end surface 256. Thus, the flange serves as a stop or means for limiting forward motion of the casing.

The inner surfaces 254, 255, 256 are coated with any suitable glossy black substance. I have found that this effects a very brilliant dark pupil of surprisingly lifelike quality and depth. If the coating on the interior of the casing is a dull black, the realistic effect is not present to nearly the same degree.

If Figs. 3 and 6 are compared, the striking effect produced by the combination of elements heretofore described will be more clearly understood. Fig. 3 represents the eyeball as it would normally appear by itself and held over any suitably light surface, such as a sheet of white paper. In this instance, the iris is just slightly darkened in appearance while the pupil is entirely clear except, of course, for the coloring produced by such tint as is provided in the particular material from which the eye is molded. The exterior portion of the eye surrounding the iris as represented by the area 229a is coated in opaque white, as heretofore stated, except for the narrow area 229b.

When, however, the eye is assembled, a considerable transformation takes place as shown in Fig. 6. Here the the pupil is a very lifelike shiny black while the iris has actually taken on a lighter hue and the area 229b becomes realistically dark. This is a very surprising fact when it is considered that the iris as shown in Fig. 3 has a light reflecting surface behind it, while as shown in Fig. 6 it has a black reflecting surface. It is pointed out that the contrast between the lightness of the iris and the darkness of the pupil is considerably more than would normally be expected by the effect on these two areas due to providing the black coating in the interior of the casing. The effect is actually over and above that which would normally be expected by virtue of the contrast produced by mere darkening of the pupil. There appears to be an increased reflectivity provided by the small plane surfaces which make up the iris and may likely be due to what may be termed a "mirror effect" which augments the reflective power of the plane surfaces by virtue of being disposed in a dark chamber. The brilliant dark pupil and the lifelike depth thereof I attribute to an optical illusion in that the observer is, I believe, seeing the shiny surface coating of the casing interior through the pupil, which surface coating being spaced from the pupil gives an effect of depth as well as brilliance.

Whatever the cause of the surprisingly high degree of light contrast effected by the particular combination of the pupil, iris planes, and glossy black surfaces of the casing as disclosed above, it is superior in lifelike quality to dolls' eyes heretofore in the prior art and the construction has the further advantage of faster production. Thus, whereas dolls' eyes are now laboriously hand painted over individual areas such as the pupil and the iris, to achieve a lifelike effect, I find that I can produce a better effect by permitting the pupil and the iris to remain substantially transparent and by merely coating the casing interiorly with black lacquer or enamel or any other glossy black substance.

Additional changes will occur to persons skilled in the art and accordingly I do not seek to be limited to the specific embodiment illustrated herein except as set forth in the appended claims.

I claim:

1. A doll's eye comprising a resilient plastic eye socket having trunnion receiving grooves, an eyeball having trunnions pivotally mounted within said grooves and having a pupil and iris area substantially exposed through an eye opening in a forward portion of said socket, a reinforcing ring within said socket to give radial support thereto and to retain said trunnions in respective grooves, and a metal casing enclosing said eyeball at the rear, said casing tightly engaging the exterior surface of the socket and compressing the socket on the ring so that the socket is squeezed between the ring and casing.

2. A doll's eye as set forth in claim 1 wherein said reinforcing ring is comprised of metal.

3. A doll's eye as set forth in claim 1 wherein said reinforcing ring is provided with a peripheral flange at the rear thereof to stiffen the ring, said peripheral flange being enclosed by said casing and engaged by said casing to securely lock said ring against longitudinal motion.

4. A doll's eye as set forth in claim 3, said reinforcing ring being made of metal.

References Cited in the file of this patent
UNITED STATES PATENTS

| | | |
|---|---|---|
| 2,219,855 | Wagler | Oct. 29, 1940 |
| 2,696,064 | Wolfe et al. | Dec. 7, 1954 |